March 11, 1947.　　　R. E. WOOLLEY　　　2,417,339
RECORDER WITH MAGNETICALLY POSITIONED INDICATOR
Filed June 23, 1943

Inventor
REW E. WOOLLEY
By Raymond W. Jenkins
Attorney

Patented Mar. 11, 1947

2,417,339

UNITED STATES PATENT OFFICE 2,417,339

RECORDER WITH MAGNETICALLY POSITIONED INDICATOR

Rew E. Woolley, Cleveland Heights, Ohio, assignor to Bailey Meter Company, a corporation of Delaware Application June 23, 1943, Serial No. 491,859

1 Claim. (Cl. 234—1)

This invention relates to measuring instruments and particularly to providing a visual indication by means of a pointer positioned relative to a scale or graduated member. My invention also relates to an indicating means to be used in conjunction with a recorder to indicate at a distance the value of the condition being recorded on a chart by a recording pen or stylus.

One object of my invention is to provide an indicator pointer cooperating with a scale located concentrically with the chart driving hub and wherein the pointer is magnetically positioned by means located behind, and concealed by, the chart and chart support.

Another object is to provide such a movable pointer having no mechanical connection with its driver.

A further object is to provide an indicator pointer mounted on the door of the meter case so that the door may be opened at will without disconnecting any mechanical connections between the pointer and its driver, and so that synchronism therebetween will never be disturbed regardless of how often the door is opened or closed.

A still further object is to provide an indicating-recording instrument of the circular chart type so constructed that the chart may readily be changed without disturbing any indicator mechanism or varying the relative position between the recording pen and the value indicated by the indicating pointer.

The type of instrument to which my invention is particularly directed may be an indicator or an indicator-recorder of quantity, quality, condition, position or any such variable. For example, the invention may be utilized in a measuring instrument adapted to indicate and record the rate of flow of a fluid, temperature, pressure, or any similar variable. For an understanding of my invention, its advantages and the specific objects obtained through its use, reference should be had to the accompanying drawing and to the specification describing the same.

Figure 1:
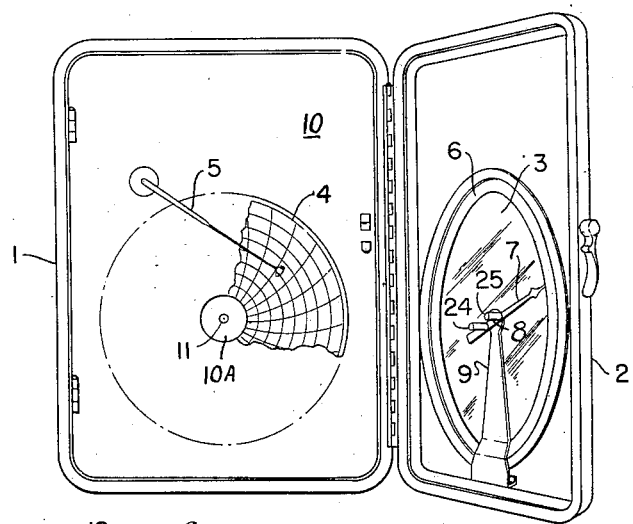
Fig. 1 is a front view (with the front cover door partially open) of an indicating-recording instrument embodying a preferred form of my invention.

Referring now to Fig. 1, I show therein a measuring instrument of the indicating-recording type having a case 1 to which is hinged a front door 2. The door is provided with a glass 3 comprising a window through which may be viewed the record chart 4 and recording pen 5. Around the periphery of the glass window 3 I provide an indicator scale 6 with which the end of a movable pointer 7 cooperates to indicate the value of the condition being measured, so that a visual indication of the condition may be had at a considerable distance from the instrument. The pointer 7 is pivotally mounted on a horizontal axis pin 8 secured to a support 9 carried by the door 2.

As clearly illustrated in Fig. 1, the door 2 may be opened from the case 1 without disturbing the mounting and movement of the pointer 7, which is freely rotatable about its axis pin 8. No mechanical connection exists between the pointer 7 and any part mounted in the case 1.

Figure 2:
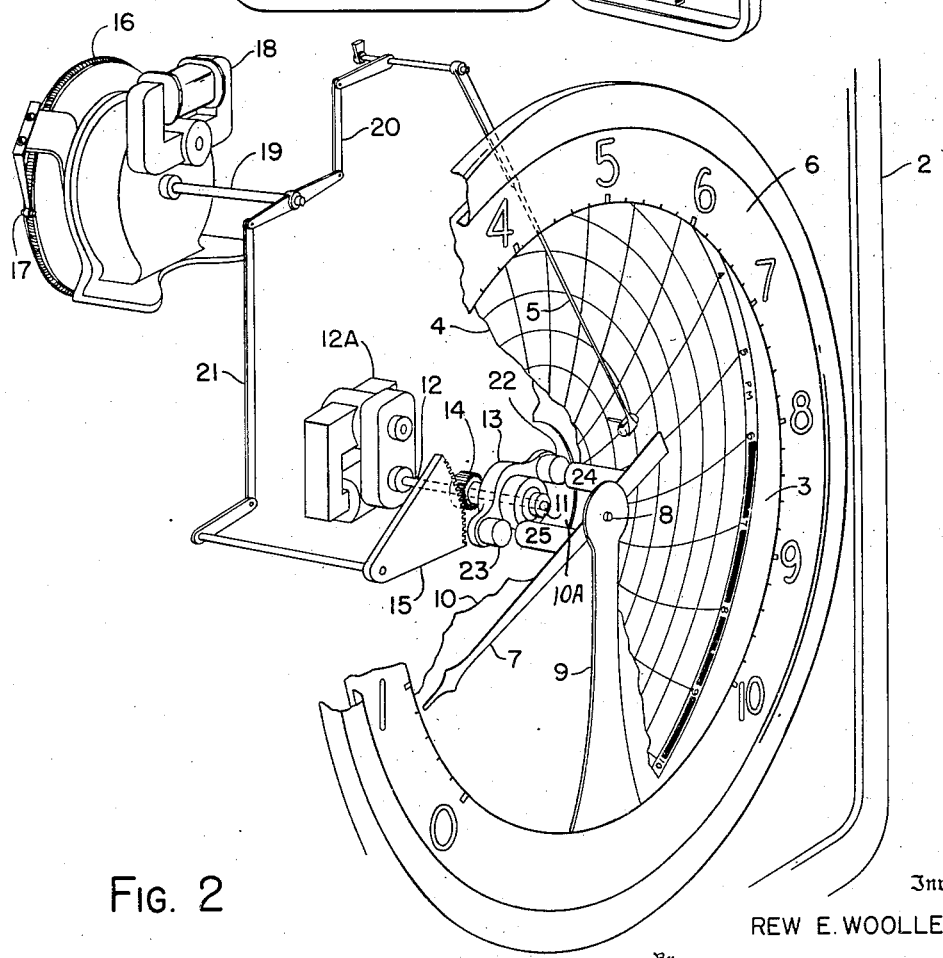
Fig. 2 is a view of the same instrument to larger scale, and with portions of the instrument cut away to show the mechanism which in Fig. 1 is concealed behind the recording chart.

Referring now to Fig. 2, I have therein shown the door 2 in closed position relative to the case 1 with the glass window 3 registering with the chart 4. In cut-away and diagrammatic fashion I have indicated certain portions of the mechanism and connecting linkage mounted in the case 1 behind a chart backing plate 10. The backing plate 10 is provided with a central hole 10A surrounding the chart supporting hub 11, and may preferably be made of non-magnetic material. If, for the sake of strength and rigidity, it is felt advisable to make the plate 10 of a magnetic material it is in that event only necessary that the diameter of the hole surrounding the chart hub 11 be increased.

The chart supporting hub 11 is carried and rotated by a shaft 12 driven in any convenient manner by a time mechanism, such as a spring wound clock or a synchronous electric motor 12A. Loosely journaled on the shaft 12 is a U-shaped magnet 13 having a pinion 14 adapted to be driven in rotation around the shaft 12 through the agency of a toothed sector 15. It will be appreciated that the parts 13 and 14 may be angularly positioned in the hole 10A of the backing plate 10 behind the chart 4 while the shaft 12 projects through the opening 10A in the backing plate 10 to terminate in the chart holding hub 11 for mounting the chart 4 relative to the front face of the backing plate 10 and for time rotation thereover.

The particular indicating-recording instrument which I am describing is of the electrical or electronic measuring type, such as a temperature measuring potentiometer having a slide wire 16 positionable relative to contact 17 through the agency of a motor 18 provided with the necessary gear reduction. The motor 18 is shown as having a shaft extension 19 from the low speed output, adapted to position the recording pen 5 through the agency of appropriate linkage 20, and to position the sector 15 through the agency of appropriate linkage 21, so that the slide wire 16, the recorder pen 5, and the magnet 13 are all positioned in unison through the agency of the motor 18 in accordance with the value to be measured or determined.

The magnet 13 is provided with pole pieces 22 and 23, whereas the pointer 7 carries pole pieces 24, 25 and forms a U-shaped magnet normally magnetically coupled to the magnet 13. In other words, the spacing of the pole pieces 22, 23 is the same as the spacing of the pole pieces 24, 25, and each magnet is adapted for rotation about an axis. The axis of the magnet 13 is in alignment with the axis of the pointer 7 carrying magnet when the door 2 is in closed position relative to the case 1. In such position of registry between the two cooperating magnets their respective pairs of pole pieces are spaced by approximately 1/8-inch, in which space lies only the paper chart 4. Thus it will be evident that the two U-shaped magnets are magnetically coupled, through the chart 4, without interfering in any respect with normal movement of the chart. Furthermore, that the driven pointer 7 magnet may be freely moved with the door 2 when the latter is opened, and thus the pointer 7 mechanism in no way interferes, nor need it be disconnected, when it is desired to change the chart 4. No physical or mechanical connections of any sort are necessary to position the pointer 7, the same being magnetically driven by the magnet 13.

The pole pieces 22, 23, 24 and 25 are preferably of Alnico magnet material having a strength such that considerable air gap may exist (in addition to the paper chart 4) between the pole pieces 22, 23 and the pole pieces 24 and 25. The strength of the pole piece of the magnet is such that as the door 2 is being closed from an open position the pull of the magnet is felt for a considerable distance before complete door closure is effected and the pointer 7 moves rapidly to exact synchronism with the magnet 13 from whatever position of its 360° rotation it may have been in when the door 2 was in open position. It is impossible with my preferred construction to close the door 2 and have the pointer 7 assume any position other than an exactly synchronous position with the magnet 13. As previously mentioned, the magnet 13 is mechanically driven by the same means 19, which positions the slide wire 16 and the recording pen 5, so that when the door 2 is in closed position the reading of the pointer 7 relative to the scale 6 is always identical with the reading of the pin 5 on the chart 4.

While I appreciate that it is known to have magnetic coupling between movable objects so that a driver may magnetically position a driven member, still to my knowledge I am the first to provide a combination of the apparatus disclosed herein, wherein a movable indicator is positionable about the same axis as a recording chart in alignment between the instrument window and the chart face and at the same time be so arranged that when the window door is opened for changing the chart no mechanical connections or movements need be interfered with or varied in any respect.

It will be appreciated that I have illustrated and described only a single preferred embodiment of my invention, and that it may in fact take any of numerous embodiments.

What I claim as new, and desire to secure by Letters Patent of the United States, is:

The combination with an instrument casing having a door hinged thereto of a chart backing plate arranged in the casing facing the door and having an opening therein, a magnet rotatably supported within said casing and having its spaced pole pieces received within said opening with their faces substantially flush with the face of said plate, means for rotating said magnet in accordance with a change in a condition to be measured, a magnet rotatably supported on the inner face of said door and having its pole pieces movable into aligned positions with the pole pieces of said first mentioned magnet at points spaced forwardly thereof when the door is closed, and a pointer also rotatably supported solely by said door and positioned by said last mentioned magnet for indicating the value of the condition measured.

REW E. WOOLLEY.

REFERENCES CITED

The following references are of record in the file of this patent:

UNITED STATES PATENTS

| Number | Name | Date |
|---|---|---|
| 1,174,787 | Wilkinson | Mar. 7, 1916 |
| 2,074,117 | Ross | Mar. 16, 1937 |
| 2,124,832 | Schofield | July 26, 1938 |
| 2,244,653 | Meer | June 3, 1941 |
| 2,307,912 | Bean et al. | Jan. 12, 1943 |
| 1,230,740 | McCracken | June 19, 1917 |
| 1,455,835 | Doolan | May 22, 1923 |
| 2,226,287 | Miller | Dec. 24, 1940 |
| 2,288,688 | Dubilier | July 7, 1942 |
| 2,353,740 | Malone | July 18, 1944 |
| 2,217,609 | Bierman | Oct. 8, 1940 |

Certificate of Correction

Patent No. 2,417,339. March 11, 1947.

REW E. WOOLLEY

It is hereby certified that errors appear in the printed specification of the above numbered patent requiring correction as follows: Column 2, line 53, for "to contact" read *a contact*; column 3, line 58, for "pin" read *pen*; column 4, line 21, after the word "thereto" insert a comma; column 4, lines 29 and 30, for "on the inner face of said door" read *solely by said door at the inner face of the latter*; and that the said Letters Patent should be read with these corrections therein that the same may conform to the record of the case in the Patent Office.

Signed and sealed this 23rd day of September, A. D. 1947.

[SEAL]

THOMAS F. MURPHY,
*Assistant Commissioner of Patents.*